United States Patent Office 3,826,756
Patented July 30, 1974

3,826,756
PROCESS FOR PREPARING DISCRETE PARTICLES OF MICROENCAPSULATED LIQUID ANAEROBIC COMPOSITIONS
Andrew G. Bachmann, Weatogue, and Gerald M. Litteral, Wethersfield, Conn., assignors to Loctite Corporation, Newington, Conn.
No Drawing. Filed Feb. 22, 1972, Ser. No. 228,285
Int. Cl. B01j 13/02; B44d 1/02
U.S. Cl. 252—316
18 Claims

ABSTRACT OF THE DISCLOSURE

An improved process is disclosed for the encapsulation of polymerizable compositions composed of acrylate ester monomers and peroxy polymerization initiators. The composition is dispersed in an aqueous liquid, following which a redox polymerization catalyst system is added to the aqueous liquid to coact with the peroxy polymerization initiator at the interface between the droplets and the aqueous liquid, and thereby form an encapsulating shell of the acrylate polymer.

BACKGROUND OF THE INVENTION

Microencapsulated liquids are well known to the worker in the art, and are best known for their use on "carbonless" copy paper. Commercial application also has been found for microencapsulated dyes or fragrances, agricultural chemicals, time release medicaments, etc.

A major area where the potential for microencapsulated liquids has not been fully explored is in the area of liquid adhesive and sealant compositions. If encapsulated, the adhesive or sealant can be placed in predetermined locations where adhesive or sealant functions are to be served, for release at a latter time upon mixture of the capsules.

Of particular interest is the encapsulation of anaerobic adhesive and sealant compositions. Anaerobic compositions are unique, precatalyzed polymerizable liquid compositions which cure by a process which is inhibited by oxygen, such as atmospheric oxygen. As long as the composition is maintained in adequate contact with oxygen, even if a half filled container, cure will not take place. However, when placed in the absence of air, such as between closely fitting metal surfaces, cure will commence within a short time.

Encapsulation of adhesive and sealant compositions, including anaerobic adhesive and sealant compositions, has been disclosed previously. See, for example, U.S. Pat. 3,489,599 to Krieble, issued Jan. 13, 1970. Inter alia, this patent discloses the formation of discrete droplets of anaerobic composition in an aqueous liquid, and contacting the droplets with, e.g., sulfur dioxide or sodium bisulfite. Rapid polymerization is initiated thereby at the surface of the droplet to form an encapsulating shell around the remainder of the liquid anaerobic composition. While this process can be used with some measure of success, certain problems remain which have placed limitations upon its commercial utility, as will be discussed more fully below.

The prior art also contains numerous other patents, which generally involve the use of a second substance or a combination of substances to form a shell wall around a liquid core. These processes usually involve the precipitation of a colloid or a synthetic organic polymer from the continuous phase of an emulsion around emulsified liquid droplets to form the encapsulated shell, or involve interfacial polymerization which involved a first substance dissolved in the liquid to be encapsulated, and a second substance dissolved in the continuous phase of the emulsion. However, these processes do not involve active participation of the liquid to be encapsulated in the formation of the shell wall.

Among other things, it is the purpose of this invention to present a novel and useful process for the encapsulation of anaerobic compositions, which is both efficient and simple of operation.

THE INVENTION

This invention involves a process for preparing discrete particles of liquid anaerobic composition encapsulated within a shell of organic polymer. The shell is formed *in situ* at the surface of the discrete droplets, and comprises in whole or in part a polymer formed from the monomer which serves as a basic component of the anaerobic composition to be encapsulated.

The process of this invention involves distributing discrete droplets of anaerobic composition in a liquid in which said composition is immiscible (said liquid frequently referred to hereafter as the "reaction medium"), followed by the addition thereto of a redox polymerization catalyst system which coacts with the peroxy initiator of the anaerobic composition to form an encapsulating shell in whole or in part from the monomer of the droplets of anaerobic composition. The redox catalyst system is designed to coact with droplets to produce continuous, durable encapsulating shell walls without causing stability problems in the internal portion of the droplet.

More specifically, the process of this invention involves the steps of: preparing an anaerobic composition comprising a polymerizable acrylate ester monomer and a peroxy polymerization initiator therefor in an amount sufficient to polymerize said monomer in the substantial absence of oxygen; dispersing and agitating the anaerobic composition in the form of discrete droplets in an immiscible liquid; adding to the immiscible liquid a first reactant which reacts with said peroxy polymerization initiator to generate free radicals; adding to the immiscible liquid a second reactant, the second reactant being a reducing agent for the first reactant; and continuing agitation until solid polymer shell walls form around the discrete droplets of liquid anaerobic composition.

DISCUSSION OF THE INVENTION AND ITS PREFERRED EMBODIMENTS

As indicated previously, this invention concerns the encapsulation of anaerobic compositions. Anaerobic compositions generally are composed of acrylate ester monomers in combination with peroxy polymerization initiators. The term "acrylate" herein is intended to include alpha-substituted acrylates, and particularly methacrylates and chloroacrylates. The nature of the acrylate ester is not critical to the broad definition of this invention. In a preferred aspect, the encapsulation of the anaerobic compositions takes place in an aqueous medium, and hence acrylate esters with low water solubility are preferred, for example acrylate esters which will not dissolve in water to a greater extent than about 2% by weight at room temperature. In another respect, anaerobic compositions which cure to form polymers which are cross-linked, or which otherwise possess substantial intermolecular bonding, produce more durable adhesives and sealants; hence, it has been found that di- or other polyacrylate esters monomers are preferred. Another preferred class is the class of monoacrylate esters wherein the alcoholic moiety of the ester contains a polar group for promoting cross linking or other intermolecular bonding. The preferred polar groups are hydroxy, amine (preferably alkyl substituted amine), halo, cyano, heterocyclic and cyclohexyl groups. Typical preferred di- or other polyacrylate ester monomers are ethylene, propylene and butylene diacrylates; polyethylene and polypropylene glycol diacrylates; trimethylol propane triacrylate; and other comparable compounds which will be will known to the skilled worker in the art. Typical examples of the above described monoacrylate esters are hydroxyethyl and hydroxypropyl acrylates; t-butylaminoethyl acrylate; cyclohexyl acrylate; t-hydrofurfuryl acrylate; and chloroethyl acrylate.

The peroxy initiator preferably is an organic hydroperoxide. While dialkyl peroxides and organic peresters have been disclosed as useful initiators, they are clearly inferior to the organic hydroperoxides and, if used, are preferably used in combination with at least a low level of organic hydroperoxide. The peroxy initiator can be used at levels from about 0.1 to about 20% by weight of the anaerobic composition, but preferably from about 0.2 to about 10%.

Other ingredients can be used in the anaerobic composition. Of most importance are the latent accelerators of polymerization. These compounds, while not initiating cure of the anaerobic composition or destroying its stability, do accelerate the rate of cure once it has been initiated by the polymerization initiator in the absence of oxygen. The preferred classes of accelerators are organic amines of essentially any type, and organic sulfimides. Routine experimentation will determine optimum use levels for these compounds, which vary from one additive to the next. Generally, a use level between about 0.1% and about 5% by weight of the anaerobic composition is suitable.

Another useful class of compounds for incorporation in the anaerobic composition are stabilizers of free radical polymerization, which assist in preventing premature cure of the composition. The most frequently used inhibitors of free radical polymerization are the quinones and hydroquinones, although many others will be known to the skilled worker in the art. In addition to these above named compounds, adhesive agents, thixotropic agents, thickeners, plasticizers, coloring agents, and any of a large number of other functional additives may be incorporated if desired.

The first step in the preparation of the encapsulated anaerobic compositions by the process of this invention is the distribution or emulsification of the anaerobic composition into a liquid reaction medium, selected because of its immiscibility with the anaerobic composition. The process will hereafter frequently be defined in terms of an aqueous reaction medium since this is a preferred aspect of the invention, although it is to be understood that other liquids are included within the broad scope of this invention.

It is frequently desirable to add additional ingredients to the reaction medium, the most common of which are emulsifying agents to assist in the formation and distribution of discrete droplets of anaerobic composition in the reaction medium. The most commonly used of these emulsifying agents in aqueous system are organic polyhydroxy compounds such as polyvinylalcohol, carboxymethylcellulose, and various sugars and sugar derivatives. The preferred emulsifier is polyvinylalcohol. It is possible to add various salts or soluble organic compounds which assist in reducing the solubility of the anaerobic composition in water, and thus increase the efficiency of the encapsulation process.

Upon addition of the anaerobic composition to the reaction medium, the system is agitated to keep the particles distributed. The rate of agitation in combination with any emulsifying agent used, as discussed above, are the prime factors in determining the particle size of the discrete droplets. For maximum utility, the encapsulated product will have an average particle size between about 50 and about 2000 microns, although it is understood in any batch of encapsulated particles a substantial distribution of particle sizes will be achieved. In order to achieve the particle size desired, a rate of agitation is selected which will produce liquid droplets approximately of the 50 to 2000 micron particle size. It has been found that such particle sizes are easily achievable with conventional mixing equipment.

In a highly preferred aspect of this invention, a monomer which is soluble in the encapsulating medium and at least slightly soluble in the anaerobic composition is added to the reaction medium, preferably before the addition and emulsification of the anaerobic composition. Monomers which will copolymerize with the acrylate ester easily can be determined by reference to the reactivity ratios of the monomers involved, which ratios are extensively published in the literature. See, for example, "Polymer Handbook," *Brandrup & Immergut,* Interscience Pub., New York, 1966.

It has been found that the preferred classes of comonomers are other acrylate esters and acrylamides. Typical examples of suitable monomers which can be used in the aqueous system are hydroxyethyl and hydroxypropyl acrylates, acrylic or methacrylic acid, acrylamide and diacetone acrylamide. The comonomer preferably is monofunctional for reasons to be discussed more fully below, but may contain polar groups of the type discussed above with reference to the acrylate esters of the anaerobic composition.

A great deal of flexibility is involved in selecting the amounts of ingredients used. For example, the amount of anaerobic composition added to the reaction medium may vary within wide ranges, such as from about 0.5% to about 25% by weight of the reaction medium. Preferably, extremely low levels are not used for reasons of productivity and efficiency. By the same token, extremely high levels are not used since emulsification becomes difficult and frequently particles will tend to agglomerate during or subsequent to the encapsulating step. A preferred range of anaerobic composition is from about 2% to about 15% by weight of the reaction medium. Emulsifying agents generally comprise from about 0.1% to about 5% by weight of the reaction medium.

Substantial flexibility also exists when comonomers are used in the reaction medium. Extremely low levels should not be used, since the benefits of the preferred operation will not be fully realized. At extremely high levels, excessive comonomer may dissolve into the anaerobic composition and alter the properties thereof and, in addition, encapsulating efficiency may be affected by the formation of substantial polymer in the reaction medium upon addition of the catalyst system, as will be discussed below. Preferably, the comonomer is used in an amount equal to from about 10% to about 300% by weight of the anaerobic composition, and more preferably, between about 50% and about 200% by weight of the anaerobic composition.

Upon the establishment of the emulsified system above, the two-component redox catalyst system is added thereto. The first component contains a compound capable of being reduced chemically to a reactive state wherein it will react with the peroxy initiator of the anaerobic composition to generate free radicals, and thereby initiate polymerization of the anaerobic composition at the surface of the discrete droplets. The second component of the catalyst system is a reducing agent which is capable of reacting with the first component and reducing it to the above-described reactive state.

The first component, or reducible compound, preferably is a transition metal compound. Preferably these materials are used in their oxidized state, although that is not absolutely essential. The transition metal compound should be soluble in the reaction medium so that it can be uniformly distributed therein for contact with the droplets of anaerobic composition. The metal of the transition metal compound, upon contact with the second component of the catalyst system, is reduced to a lower oxidation state and thereafter, upon contact with the peroxy initiator, will generate free radicals to institute polymerization at the surface of the discrete droplet of anaerobic composition.

The transition metal is used at a relatively low level compared to the anaerobic composition. This is to prevent migration of an undesirably large amount of transition metal into the anaerobic composition prior to the formation of the capsule shell wall where, then or thereafter, premature hardening of the liquid core could result. Preferably, the transition metal is added to the system in an amount sufficient to produce a molar transition metal content equal to from about 0.001 to about 0.2 for each mole of peroxy polymerization initiator contained in the anaerobic composition which is present in the reaction medium. Most preferably, the transition metal is present between from about 0.005 to about 0.1 mole for each mole of peroxy polymerization initiator. In these ranges, maximum efficiency is obtained while producing stable encapsulated products.

Preferred transition metals for use in the transition metal compounds are iron, copper, cobalt, manganese, tin, titanium, chromium and antimony. Iron and copper are preferred, and the singly most highly preferred is iron. These metals may be used in any of their forms which are soluble in the reaction medium. When an aqueous system is used they preferably are in the form of inorganic compounds such as the chlorides, bromides, nitrates, nitrites, etc.

The reducing agent of the catalyst system is added to regenerate the reactive state of the transition metal subsequent to the reaction of the transition metal and the peroxy polymerization initiator. In this manner, lower amounts of transition metal can be used without adversely affecting the efficiency of the encapsulation process or the stability of the encapsulated anaerobic composition. This technique also produces a slower encapsulation process than is achieved by the simple addition of a larger amount of a single reactant. The result is a more uniform and durable, contiguous shell wall than has been achieved previously. When, e.g., sodium bisulfite was used, a brittle shell wall was formed which contained numerous cracks and other imperfections which lead to stability problems in the anaerobic composition and loss of encapsulated liquid. It was also found previously that sufficient extremely active material migrated into the anaerobic composition upon immediate contact to make the achieving of a truly stable liquid core extremely difficult.

To achieve the ability to regenerate the active species of the transition metal compound, the reducing agent of the catalyst system should be used in molar excess compared to the transition metal. Preferably, the molar content of the reducing agent is between about 1.1 and about 5 times the molar content of the transition metal, and most preferably is between about 1.5 and about 3 times.

Typical reducing agents which can be used are inorganic acids and salts, such as hydrogen iodide and potassium iodide; organic reducing agents, such as ascorbic acid, oxalic acid, hydroquinone and pyrogallol; and other well known reducing agents, such as the inorganic metal hydrides, e.g., sodium boron hydride and lithium aluminum hydride. Of the above-named materials, ascorbic acid is the preferred reducing agent in view of its efficiency, availability and ease and safety of use.

The above-described reactions for forming the encapsulating shell wall are allowed to proceed until a shell wall of sufficient durability is formed for the particles to be handled efficiency. It also is preferred that the reaction not be allowed to proceed for an excessively long period of time since it appears that there is sufficient migration of reactants through the shell wall to continue the formation of additional shell wall inwardly, which adversely affects the stability of the core liquid and also unnecessarily reduces the liquid core content. Routine experimentation will easily determine for any given combination of reactants what reaction time is desirable. As a general rule, the reaction should fall within the range of about 0.1 to about sixty minutes, and preferably from about 0.5 to about ten minutes. When the reaction has proceeded as far as desired, the capsules may be removed from the reaction medium.

In a preferred embodiment of the invention, an excess of an oxidizing agent is added to the encapsulation medium prior to removal of the encapsulated anaerobic composition in order to terminate the shell forming reactions, by consuming any residual reducing agent and by oxidizing the transition metal to its unreactive high oxidation state. Essentially any conventional oxidizing agent, preferably soluble in the encapsulation medium, can be used. The amount is not critical, as long as the amount used is sufficient to oxidize both components of the redox catalyst system discussed previously. Typical examples of suitable materials are found in the entire range of water soluble peroxy compounds, such as peroxides, hydroperoxides, peracids, peresters, etc., or such materials as potassium iodide, potassium perchlorate, sodium thiosulfate. For reasons of efficiency of use and ready availability, hydrogen peroxide is perferred.

The process described above is conveniently used at room temperature, and the above discussion is most pertinent to such operation. Naturally, the reaction temperature may be varied, and such may be desirable for certain combinations of ingredients. It also should be noted that there is some migration of ingredients from the anaerobic composition to reaction medium and vice-versa, but this does not adversely affect the encapsulation process. This migration is most commonly seen in terms of formation of polymer from the water soluble comonomer in the reaction medium—an indication of migration of peroxy initiator into the reaction medium. This polymer is easily discarded along with the reaction medium subsequent to the encapsulation process.

The encapsulated anaerobic composition produced by the above-described process may be used directly as a slurry in the reaction medium, if such application is possible, or preferably is filtered from the reaction medium, allowed to dry, and stored until the time of usage.

The process described herein has been found extremely convenient in terms of short manufacturing time, efficiency of encapsulation, and production of uniform, stable, microencapsulated products. When at least part of the acrylate ester is a polyacrylate ester, a cross-linked shell wall is formed which is durable and sufficiently hard subsequent to manufacture that little if any problem is encountered in the praparation of discrete, non-agglomerated particles. By the same token, using the comonomer technique previously described, these benefits can be retained while producing shell walls of reduced brittleness which are far more durable and resistant to cracking such as under vibration and impact conditions. This combination of properties has not been available in the related prior art processes for encapsulating anaerobic compositions.

EXAMPLES

The following examples are given to demonstrate the materials and process steps within the scope of the invention disclosed herein. These examples are not intended to be limitations in any way upon the scope of the invention. Unless specifically stated to the contrary herein, all ratios and percentages used in the following examples are on a weight basis.

Example I

Into a large laboratory beaker were placed approximately 2000 milliliters of distilled water containing approximately 15 grams of polyvinylalcohol. Into this mixture were emulsified 100 milliliters of an anaerobic composition having the following approximate composition:

|  | Percent |
|---|---|
| Polyethyleneglycol dimethacrylate (average molecular weight=330) | 94.5 |
| Cumene hydroperoxide | 3.0 |
| Diethyl-p-toluidine | 0.6 |
| Dimethyl-o-toluidine | 0.3 |

To the above mixture were added minor amounts of an oil soluble dye for visibility purposes, and minor amounts of stabilizers to increase the stability of the anaerobic composition.

The system was agitated by means of a standard laboratory propeller-type agitator at a speed of 60 revolutions per minute. After the system was allowed to agitate for several minutes to obtain an emulsion with relatively uniform particle size distribution, two milliliters of a saturated water solution (approximately 48% by weight) of $Fe(NO_3)_3 \cdot 9H_2O$ were added to the agitated system, followed by 8 milliliters of a saturated water solution (approximately 21% by weight) of ascorbic acid. The system was allowed to agitate for approximately 2½ minutes longer, after which approximately 2 milliliters of a 30% aqueous solution of hydrogen peroxide was added to completely oxidize the catalytic agents.

It was found that discrete, substantially spherical particles had been formed in reaction mixture, and these particles were separated by filtration and spread on absorbent paper to air-dry overnight. Upon examination the following day the particles were found to be composed of a hard contiguous polymer shell surrounding a liquid core of the anaerobic composition. The liquid was found to comprise approximately 70% by weight of the particle. Upon storage, it was found that these microcapsules remained substantially unchanged in appearance, and retained their liquid core for a minimum of six months at room temperature.

It was found that the capsules could be coated onto the threaded surfaces of standard bolts, and that the capsules were ruptured upon assembly with a mating nut. The liquid was released and within about one hour, had hardened to form a strong, durable bond between nut and bolt.

Example II

The process of Example I was repeated using essentially identical ingredients and amounts thereof, and essentially the same processing times and conditions, with the exception that approximately 100 milliliters of hydroxyethyl methacrylate were added to the water/polyvinylalcohol solution prior to the emulsification therein of the anaerobic composition.

It was noticed that the process proceeded essentially as described in Example I, except that the aqueous phase turned a milky color upon addition of the hydrogen peroxide. This was believed to be caused by the formation of poly(hydroxyethylmethacrylate) in the liquid phase. The aqueous phase containing the poly(hydroxyethylmethacrylate) was discarded, and the encapsulated products were thoroughly washed to remove this polymer from their surface.

The encapsulated products produced by this Example were compared with the encapsulated products of the first Example. While excellent encapsulated products were obtained in each case, it was found that the shell wall surrounding the capsules of the second example was less brittle and more durable than the shell wall of the capsules of the first example. It also was found that somewhat higher percentages of liquid were contained within the capsules of the second example, although in each case the average particle size was substantially the same, e.g., about 700 to 800 microns.

Example III

The process of Example II was repeated, except that the 100 milliliters of hydroxyethyl methacrylate were replaced by a 50/50 volume mixture of hydroxypropyl methacrylate and diacetone acrylamide. Results were essentially as described above for Example II, except that the capsules produced in Example III produced even slightly higher liquid core percentages and less brittle shell walls than those described in Example II.

When, in the above Example, either or both of the hydroxypropyl methacrylate or diacetone acrylamide is replaced in whole or in part by any of the compounds listed below, or a combination thereof, substantially similar results are obtained in that microcapsules of anaerobic composition are produced, which microcapsules have shell walls which are relatively durable, nonbrittle and contiguous: acrylic acid, methacrylic acid, methylmethacrylate, methylacrylate, acrylamide, methacrylamide, dimethylacrylamide, dimethylmethacrylamide and hydroxymethylol acrylamide.

Example IV

The process of Example III was repeated, except that an equivalent of cupric nitrate was used instead of the ferric nitrate. Substantially similar results were obtained in that substantially spherical microenacapsulated particles of anaerobic composition were obtained. The only noticeable difference in the reaction was the encapsulation reaction proceeded somewhat more rapidly when the cupric nitrate was used.

We claim:
1. A process for preparing discrete particles of microencapsulated liquid anaerobic composition which comprises:
    (1) preparing an anaerobic composition comprising a polymerizable acrylate ester monomer and a peroxy polymerization initiator therefor in an amount sufficient to polymerize said monomer in the substantial absence of oxygen;
    (2) dispersing and agitating said anaerobic composition in the form of discrete droplets in an immiscible liquid;
    (3) adding to said immiscible liquid a transition metal compound which is soluble in said immiscible liquid and which is capable of being reduced to a reactive state wherein it reacts with said peroxy polymerization initiator to generate free radicals, said transition metal compound being used in a molar amount which is less than the molar amount of the peroxy polymerization initiator;
    (4) adding to said immiscible liquid a second reactant which is soluble in said immiscible liquid, said second reactant being a reducing agent for said transition metal compound and selected from the group consisting of inorganic acids and salts, ascorbic acid, oxalic acid, hydroquinone and pyrogallol, and being added in a molar amount which exceeds the molar amount of the transition metal compound; and
    (5) continuing agitation until solid polymer shell walls form around the discrete droplets of liquid anaerobic composition.
2. A process for preparing discrete particles of microencapsulated liquid anaerobic compositions which comprises:
    (1) preparing an anaerobic composition comprising a polymerizable acrylate ester monomer and a hydroperoxy polymerization initiator in an amount sufficient to polymerize said monomer in the substantial absence of oxygen;
    (2) emulsifying said anaerobic composition in an immiscible liquid with sufficient agitation to produce discrete droplets with an average particle size of from about 50 to about 2,000 microns;
    (3) adding to said immiscible liquid a transition metal compound soluble in said immiscible liquid in an amount sufficient to produce from about 0.001 to about 0.2 moles of transition metal per mole of hydroperoxy polymerization initiator;
    (4) adding to said immiscible liquid a reducing agent for said transition metal compound in a molar amount greater than the molar amount of said transition metal compound; and
    (5) continuing agitation until solid polymer shell walls form around the discrete droplets of liquid anaerobic composition.

3. A process for preparing discrete particles of microencapsulated liquid anaerobic compositions which comprises:
   (1) preparing an anaerobic composition comprising a polymerizable polyacrylate ester monomer and a hydroperoxy polymerization initiator therefor in an amount sufficient to polymerize the polyacrylate ester monomer in the substantial absence of oxygen;
   (2) emulsifying said anaerobic composition in an aqueous liquid with sufficient agitation to produce discrete droplets with an average particle size between about 50 to about 2,000 microns;
   (3) adding to said aqueous liquid a water soluble monomer capable of copolymerizing with the polyacrylate ester monomer;
   (4) adding to said aqueous liquid a water soluble transition metal compound in an amount sufficient to produce from about 0.001 to about 0.2 moles of transition metal per mole of hydroperoxy polymerization initiator;
   (5) adding to the aqueous liquid a reducing agent for said transition metal compound in an amount sufficient to produce from about 1.1 to about 10 moles of reducing agent per mole of transition metal compound;
   (6) continuing agitation until solid polymer shell walls form around discrete droplets of liquid anaerobic composition to form an encapsulated liquid product; and
   (7) removing said encapsulated product from contact with said aqueous liquid.

4. The process of Claim 1 wherein the peroxy polymerization initiator is a hydroperoxy initiator and the first compound is a soluble compound of a transition metal.

5. The process of Claim 4 wherein a polymerizable monomer capable of copolymermizing with said acrylate ester monomer is added to the immiscible liquid prior to the first and second reactants.

6. The process of Claim 2 wherein the acrylate ester monomer is a polyacrylate ester monomer, the immiscible liquid is an aqueous liquid, and the hydroperoxy polymerization initiator comprises from about 0.2 to about 10% by weight of the anaerobic composition.

7. The process of Claim 6 wherein the transition metal compound is selected from the class consisting of soluble compounds of iron, copper, cobalt, manganese, tin, titanium, chromium and antimony.

8. The process of Claim 7 wherein the transition metal compound is used in a molar amount between about 0.005 and about 0.1 moles for each mole of hydroperoxy polymerization initiator, and the reducing agent is used in a molar amount between about 1.1 and about 5 moles for each mole of transition metal.

9. The process of Claim 8 wherein the reducing agent is ascorbic acid.

10. The process of Claim 6 wherein a water soluble monomer capable of copolymerizing with the acrylate ester monomer is added to the aqueous liquid prior to the addition of the transition metal compound and the reducing agent.

11. The prcess of Claim 10 wherein the water soluble monomer is selected from the class consisting of acrylate ester and acrylamide monomers, and is added in an amount between about 50% and about 200% by weight of the anaerobic composition.

12. The process of Claim 3 wherein the hydroperoxy polymerization initiator is an organic hydroperoxide and comprises from about 0.2% to about 10% by weight of the anaerobic composition.

13. The process of Claim 12 wherein the transition metal is selected from the class consisting of iron, copper, cobalt, manganese, tin, titanium, chromium and antimony.

14. The process of Claim 13 wherein the reducing agent is used in a molar amount between about 1.1 and about 5 moles for each mole of transition metal.

15. The process of Claim 14 wherein the water soluble monomer is selected from the class consisting of acrylate ester and acrylamide monomers, and the reducing agent is ascorbic acid.

16. The process of Claim 1 comprising the additional step of terminating the shell forming reaction by adding to said immiscible liquid an oxidizing agent in sufficient excess to oxidize both the transition metal compound and the reducing agent completely.

17. The process of Claim 2 comprising the additional step of terminating the shell forming reaction by adding to said immiscible liquid an oxidizing agent in sufficient excess to oxidize both the transition metal compound and the reducing agent completely.

18. The process of Claim 3 comprising the additional step, after step 6 and before step 7, of terminating the shell forming reaction by adding to said aqueous liquid an oxidizing agent in sufficient excess to oxidize both the transition metal compound and the reducing agent completely.

References Cited
UNITED STATES PATENTS

| | | | |
|---|---|---|---|
| 3,704,264 | 11/1972 | Gorman | 252—316 |
| 3,030,319 | 4/1962 | Kaizerman et al. | 260—89.5 X |
| 3,446,752 | 5/1969 | Ishii et al. | 260—89.5 X |
| 2,969,330 | 1/1961 | Brynko | 252—316 |

RICHARD D. LOVERING, Primary Examiner

U.S. Cl. X.R.

117—100 A; 151—41.7; 161—DIG.1; 252—182; 260—89.5 A, 89.5 AW, 89.5 H, 89.5 R; 264—4